United States Patent Office 3,281,398
Patented Oct. 25, 1966

3,281,398
HYDROCARBON POLYMERS OF DIVINYLCYCLO-OCTENE AND AT LEAST ONE ALPHA-OLEFIN AND A PROCESS FOR PREPARING THE SAME
Giulio Natta, Giorgio Mazzanti, Alberto Valvassori, and Guido Sartori, all of Milan, Italy, assignors to Montecatini Societa Generale per l'Industria Mineraria e Chimica, Milan, Italy
No Drawing. Filed July 31, 1964, Ser. No. 386,746
Claims priority, application Italy Mar. 2, 1962, 4,189/62; Aug. 5, 1963, 16,147/63
17 Claims. (Cl. 260—79.5)

This application is a continuation-in-part of our application Serial No. 261,523, filed February 27, 1963.

This invention relates to a new class of substantially linear, amorphous, vulcanizable, high molecular weight olefin copolymers and to a process for preparing them.

In our pending application Serial No. 261,523, filed February 27, 1963, we disclosed new vulcanizable amorphous copolymers of monoalkenyl cycloalkenes, such as more particularly 4-vinylcyclohexene-1, with monoolefinic monomers. These copolymers were obtained with the aid of catalysts acting with a coordinated anionic mechanism, more particularly with catalysts obtained from vanadium compounds and metallorganic aluminum or beryllium compounds. In said application, we also disclosed the preparation of new vulcanizable amorphous copolymers of polyalkenyl cycloalkenes with monoolefinic monomers.

The present application is directed, more particularly, to our new, linear, amorphous, vulcanizable unsaturated copolymers of one or more monoolefinic monomers, more particularly selected from ethylene and higher alpha-olefins, with poly-alkenylcycloalkenes, namely with hydrocarbon monomers containing at the same time unsaturations in a naphthenic cycle and unsaturations in more than one side aliphatic chain.

Non-restrictive examples of polyalkenylcycloalkenes that can be used are: divinylcyclobutenes, diallylcyclohexenes, vinylmethallylcyclopentenes, di-methallylcyclooctenes, divinylcyclooctenes.

Particularly advantageous results are obtained by using divinyl cyclooctenes, such as more particularly 1,2-divinylcyclooctene-5. This monomer can be obtained by thermal isomerisation of cyclododecatriene which can be obtained from butadiene.

The monoolefinic monomer or monomers copolymerized with the polyenes to obtain the amorphous, vulcanizable copolymers are selected from ethylene and aliphatic alpha-olefins having the general formula $CH_2=CHR$, in which R is an alkyl group containing from 1 to 6 carbon atoms. One or more of the monoolefins may be copolymerized with the polyenes. Preferably, the monoolefinic monomers are selected from ethylene, propylene and butene-1.

The copolymers consist of unsaturated macromolecules consisting of monomeric units deriving from each of the monomers used.

For instance, by copolymerizing a mixture of ethylene, propylene and/or butene-1 and 1,2-divinylcyclooctene-5, a crude polymerization product is obtained which consists of macromolecules each containing monomeric units deriving from ethylene, propylene and/or butene-1 and 1,2-divinylcyclooctene-5.

Each of the monomeric units derived from the polymerization of the aforementioned polyalkenylcycloalkenes still contains two or more free unsaturations.

These unsaturations are reactive points for successive reactions carried out on the polymer. For example, the sites of unsaturation in the copolymers permit the vulcanization of the copolymers with mixes containing sulfur, of the type commonly used for unsaturated rubbers, preferably for those having a low unsaturation content. The double bonds present in the macromolecules can also form, by oxidation by means of ozone, polar groups, such as, e.g., carbonyl groups, which in turn can be reactive points for successive reactions (e.g., vulcanization with polyvalent basic substances) and can be utilized in order to improve the adhesivity of the polymer. The double bonds can also be utilized for addition reactions with metal hydrides, such as LiH, $NaBH_4$, $AlH(C_4H_9)_2$, etc. The metal-to-carbon bonds thus formed can then be utilized for further reactions.

The present copolymers have a substantially linear structure, demonstrated by the fact that they have properties, such as, more particularly, a viscous behavior, practically identical with those of known linear copolymers, such as e.g., linear copolymers of ethylene and higher alpha-olefins.

The molecular weight of these copolymers, determined viscosimetrically, is higher than 20,000 corresponding to an intrinsic viscosity (determined in tetrahydronaphthalene at 135° C. or in toluene at 30° C.) higher than 0.5. The intrinsic viscosity of the copolymers may vary between 0.5 and 10 but it can also reach higher values. For most practical purposes, however, copolymers having an intrinsic viscosity between 1 and 5 are preferably used.

The composition of the copolymers can be defined as practically homogeneous and the various monomeric units are distributed at random.

The homogeneity of these copolymers is confirmed by the possibility of obtaining well vulcanized products, using the techniques normally used in the vulcanization of unsaturated rubbers, preferably having a low unsaturation content such as butyl rubber.

That the unsaturations are well distributed along the macromolecular main chains of the copolymers is confirmed by the fact that the vulcanized products obtained therefrom are completely insoluble in organic solvents, such as aliphatic hydrocarbons, and are only swollen to a limited extent by some aromatic solvents, whereas prior to vulcanization the copolymers are completely soluble in boiling n-heptane.

Moreover the vulcanized rubbers obtained from these copolymers have a very good mechanical strength and a low permanent set at break. More particularly they have high reversible elastic elongations and, when reinforcing fillers such as carbon black have been used in the mixes, they also have a high tensile strength. The elastomers obtained by vulcanization can be advantageously used, due to their high mechanical characteristics, in the preparation of various manufactured articles, such as pipes, air tubes, tapes, foils, elastic yarns, etc.

The copolymers can be extended or plasticized with hydrocarbon oils. Paraffinic and naphthenic oils are preferably used but aromatic oils can also be used.

The catalytic systems which can be used for producing the present copolymers are as described in our pending application referred to hereinabove. Such systems are highly dispersed, amorphous colloidally dispersed, or completely dissolved in the hydrocarbons used as copolymerization medium, (e.g. aliphatic, cycloaliphatic or aromatic hydrocarbons or mixtures thereof) and are prepared from organometallic aluminum or beryllium compounds and vanadium compounds.

More particularly, in the preparation of the catalyst there are used organometallic compounds such as: beryllium dialkyls, beryllium alkyl halides, beryllium dairyls, aluminum trialkyls, aluminum dialkyl monohalides, aluminum monoalkyl dihalides, aluminum alkenyls, aluminum alkylenes, aluminum cycloalkyls, aluminum cycloalkyl alkyls, aluminum aryls, aluminum alkylaryls, aluminum dialkylalkoxides, aluminum alkyl alkoxyhalides, and complexes of the aforementioned organic aluminum compounds with preferably weak Lewis bases.

Non-limitative examples of organometallic compounds belonging to the aforementioned groups are:

beryllium diethyl,
beryllium methylchloride,
beryllium dimethyl,
beryllium di-n-propyl,
beryllium diisopropyl,
beryllium di-n-butyl,
beryllium di-tert. butyl,
beryllium diphenyl,
aluminum triethyl,
aluminum triisobutyl,
aluminum trihexyl,
aluminum diethyl monochloride,
aluminum diethyl monofluoride,
aluminum diisobutyl monochloride,
aluminum monoethyl dichloride,
aluminum ethyl sesquichloride,
aluminum butenyldiethyl,
aluminum isohexenyl diethyl,
2-methyl-1,4-di(diisobutylaluminum)butane,
aluminum tri(cyclopentylmethyl),
aluminum tri(dimethyl cyclopentylmethyl),
aluminum triphenyl,
aluminum tritolyl,
aluminum di(cyclopentyl methyl) monochloride,
aluminum diisobutyl monochloride complexed with anisole,
aluminum monochloro-monoethyl monoethoxide,
aluminum diethylpropoxide,
aluminum diethylamyloxide,
aluminum monochloromonopropylmonopropoxide,
aluminum monochloromonopropylmonoethoxide.

Vanadium compounds soluble in the hydrocarbons used as the polymerization medium are preferably used in combination with the organometallic aluminum or beryllium compound, in preparing the catalyst. Such vanadium compounds includes vanadium halides and oxyhalides (e.g., $VCl_4$ $VOCl_3$ $VBr_4$) and vanadium compounds in which at least one of valences of the metal is saturated with a heteroatom (more particularly oxygen or nitrogen) bound to an organic group, such as e.g., vanadium triacetylacetonate, vanadium tribenzoylacetonate, vanadyl diacetylacetonates and halogen, acetylacetonates, vanadyl trialkoxides and halogen alkoxides, the complexes of tetrahydrofurane, ethers and amines with vanadium trichloride and tetrachloride and with vanadyl trichloride, and the complexes of pyridine and quinoline with vanadium tri- and tetrachloride and with vanadyl trichloride.

Hydrocarbon-insoluble vanadium compounds such as vanadium triacetate, tribenzoate or tristearate can also be used. In practice, in order to obtain the best results, it is necessary to operate in the presence of catalytic systems containing halogens, obtained from metallorganic aluminum or beryllium compounds and vanadium compounds, in which at least one of the valences of aluminum or beryllium and/or of vanadium is saturated with a halogen atom.

The copolymerization can be carried out at temperatures between —80 and 125° C.

When catalysts prepared from vanadium triacetylacetonate, vanadyl diacetylacetonate, vanadyl halogen acetylacetonate, or in general, from a vanadium compound such as, besides those mentioned above, $VCl_4$ or $VOCl_3$ in the presence of aluminum alkylhalides, in order to obtain a high yield of copolymer per weight unit of catalyst used, it is convenient to carry out both the preparation of the catalyst and the copolymerization at temperatures comprised between 0° and —80° C., preferably between —10° C. and —50° C. By operating under these conditions the catalysts exhibit a much higher activity than that of the same catalytic systems prepared at higher temperatures. Moreover, by operating in the aforementioned range of low temperatures, the activity of the catalysts remains practically unaltered with time.

When catalysts prepared from an aluminum alkyl halide and vanadium triacetylacetonate, vanadyl trialkoxides or vanadyl halogen-alkoxides are used, at temperatures comprised between 0° C. and 125° C., in order to obtain high yields of copolymer it is convenient to operate in the presence of particular complexing agents selected from ethers, thioethers, tertiaryamines or trisubstituted phosphines containing at least one branched alkyl group or an aromatic nucleus.

The complexing agent can be an ether having the formula RYR' in which Y is oxygen or sulfur and R and R' are linear or branched alkyl groups containing 1 to 14 carbon atoms or an aromatic nucleus containing 6 to 14 carbon atoms, at least one of R and R' being a branched alkyl group or an aromatic nucleus.

The complexing agent can be tertiary amine having the formula

in which R, R' and R'' each represent an alkyl group containing 1 to 14 carbon atoms or an aromatic nucleus containing 6 to 14 carbon atoms, at least one of R, R' and R'' being an aromatic nucleus.

The complexing agent can also be a tertiary phosphine having the formula

in which R, R' and R'' each represent an alkyl radical containing 1 to 14 carbon atoms or an aromatic nucleus containing 6 to 14 carbon atoms, at least one of R, R' and R'' being aromatic nucleus.

The amount of complexing agent used is preferably comprised between 0.05 and 1 mole per mole of aluminum alkyl halide.

The activity of the catalysts varies with the molar ratio between the compounds used in the preparation of the catalyst. It has in fact been found that if, e.g., aluminum trialkyls and vanadium halides or oxyhalides are used, it is desirable to use catalysts in which the molar ratio of aluminum trialkyl to vanadium compounds is comprised between 1 and 5, preferably between 2 and 4.

If, on the contrary, aluminum diethyl monochloride $(Al(C_2H_5)_2Cl)$ and vanadium triacetylacetonate $(VAc_3)$ are used, the best results are obtained with an

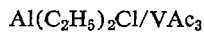

molar ratio comprised between 2 and 20, preferably between 4 and 10.

The copolymerization can be carried out in the presence of a solvent selected from aliphatic, cycloaliphatic or aromatic hydrocarbons, such as e.g., butane, pentane, n-heptane, cyclohexane, benzene, toluene, xylene or mixtures thereof. Halogenated hydrocarbons, such as methylene chloride, chloroform, trichloroethylene, tetrachloroethylene, chlorobenzenes, etc., can also be used as the copolymerization medium or diluent.

Particularly high copolymerization rates can be obtained when the copolymerization is carried out in the absence of an inert solvent, using the monomers in the liquid state, namely in the presence of a solution of ethylene in the mixture of alpha-olefins and of hydrocarbons containing double bonds, kept in the liquid state.

In order to obtain copolymers having a highly homogeneous composition, the ratio between the concentrations of the monomers to be copolymerized, present in the liquid phase, should conveniently be kept constant or at least as constant as possible. For this purpose it may be convenient to carry out the copolymerization continuously by continuously feeding and discharging the monomers' mixture having constant composition and by operating with high spatial rates.

The composition of the copolymers can be varied within wide limits by varying the composition of the mixture of monomers.

If amorphous terpolymers of the said polyenic monomers with ethylene and propylene are desired, a molar ratio of ethylene to propylene lower than or at most equal to 1:4 should be maintained in the reacting liquid phase (corresponding to a ratio of 1:1 in the gaseous phase under standard conditions). Molar ratios in the liquid phase between 1:200 and 1:4 are usually preferred.

When butene-1 is used in place of propylene, the ethylene/butene molar ratio should be lower than or at most equal to 1:20, corresponding to an ethylene/butene-1 molar ratio in the gaseous phase of 1:1.5 under standard conditions. Molar ratios, in the liquid phase, between 1:1000 and 1:20 are usually preferred.

By operating under these conditions, amorphous terpolymers containing less than about 75% by mols of ethylene are obtained. If these values are exceeded, the terpolymer presents a crystallinity of polyethylenic type. The lower limit of the ethylene content is not critical; it is however preferable that the terpolymers contain at least 5% by mols of ethylene.

The alpha-olefin content in the amorphous terpolymer is preferably between 5% and 95% by mols.

The polyene content of the terpolymer is preferably between 0.1 and 20% by mols. This upper limit can be raised but, more particularly for economical reasons, it is not convenient to introduce into the terpolymer a polyene content higher than about 20% by mols.

If, on the contrary, binary ethylene-polyene amorphous copolymers are desired, the polyene content should not exceed 25% by mols.

The following examples illustrate the present invention without limiting its scope.

*Example 1*

The reaction apparatus consists of a glass cylinder having a diameter of 5.5 cm. and a capacity of 750 ml., provided with an agitator and gas inlet and outlet tubes, immersed in a thermostatic bath at —20° C. The gas inlet tube reaches the bottom of the cylinder and ends with a porous diaphragm.

200 cc. of anhydrous n-heptane and 5 cc. of 1,2-divinylcyclooctene-5 are introduced into the reactor kept under nitrogen.

Through the gas inlet tube, a gaseous propylene-ethylene mixture in the molar ratio of 2:1 is introduced and circulated at the flow-rate of 200 N liters/hour.

The catalyst is pre-formed at —20° C. in a 100 ml. flask kept under nitrogen, by reacting 2 millimols of vanadium tetrachloride and 10 millimols of aluminum diethylmonochloride in 30 ml. of anhydrous n-heptane. The catalyst thus prepared is siphoned into the reactor under a nitrogen pressure.

The propylene/ethylene mixture is fed and discharged continuously at the spatial rate of 400 N liters/hour.

After about 10 minutes, the reaction is stopped by the addition of 10 ml. of methanol containing 0.1 g. of phenyl-beta-naphthylamine. The polymer is purified in a separating funnel under nitrogen by repeated treatments with aqueous hydrochloric acid and then with water and is finally coagulated in acetone.

After drying under vacuum, 7 g. of a solid product which is amorphous under X-rays examination, has the appearance of a non-vulcanized elastomer and is completely soluble in boiling n-heptane are obtained. The infrared spectrographic examination, shows the presence of unsaturations (zone between 6 and 6.5 microns). The ethylene/propylene molar ratio is about 1:1.

100 parts of the terpolymer are mixed in a laboratory roll mixer with 1 part of phenyl-beta-naphthylamine, 2 parts of sulfur, 5 parts of zinc oxide, 1 part of tetramethylthiuram disulphide and 0.5 part of mercaptobenzothiazole. The mix thus obtained is vulcanized in a press at 150° C. for 60 minutes. A vulcanized lamina having the following characteristics is thus obtained.

Tensile strength, kg./cm.$^2$ _____ 28
Elongation at break, percent _____ 530
Modulus at 300%, kg./cm.$^2$ _____ 12

*Example 2*

200 cc. of anhydrous n-heptane and 5 cc. of 1,2-divinylcyclooctene-5 are introduced into the apparatus described in Example 1, kept at —20° C. Through the gas inlet tube a gaseous propylene/ethylene mixture, in the molar ratio of 3:1, is introduced and circulated at the spatial rate of 400 N liters/hour.

The catalyst is pre-formed in a 100 ml. flask kept under nitrogen by reacting 2 millimols of vanadium oxytrichloride with 10 millimols of aluminum disobutylmonochloride in 30 ml. of anhydrous n-heptane.

The catalyst thus preformed is siphoned into the reactor under nitrogen pressure.

The propylene-ethylene mixture is fed and discharged continuously at the spatial rate of 400 N liters/hour.

After about 13 minutes, the reaction is stopped by adding 10 ml. of methanol containing 0.1 g. of phenyl-beta-naphthylamine.

The product is purified and isolated as described in Example 1. After vacuum drying, 6.5 g. of a solid product which appears to be amorphous by X-ray examination, looks like a non-vulcanized elastomer and is completely soluble in boiling n-heptane are obtained.

The infrared spectrographic examination shows the presence of unsaturations (zone between 6 and 6.5 microns). The ethylene/propylene molar ratio is about 1:1. The intrinsic viscosity determined in toluene at 30° C. is 2.6 dl./g. The terpolymer is vulcanized with the mix and under the conditions of Example 1 to obtain a vulcanized lamina having the following characteristics:

Tensile strength, kg./cm.$^2$ _____ 34
Elongation at break, percent _____ 480
Modulus at 300%, kg./cm.$^2$ _____ 13

*Example 3*

200 cc. of anhydrous n-heptane and 5 cc. of 1,2-divinylcyclooctene-5 are introduced into the apparatus described in Example 1, kept at —20° C. Through the gas inlet tube a gaseous propylene ethylene mixture in the molar ratio of 4:1 is introduced and circulated at the flow-rate of 200 N liters/hour.

In a 100-cc. flask kept under nitrogen the catalyst is preformed by reacting 2.8 millimols of vanadium triacetylacetonate and 14 millimols of aluminum diethyl monochloride in 20 cc. of anhydrous toluene at —20° C. The catalyst thus pre-formed is kept at —20° C. for 5 minutes and is then siphoned into the reactor under a nitrogen pressure.

The propylene-ethylene mixture is fed and discharged continuously at the flow-rate of 200 N liters/hour. After 20 minutes the reaction is stopped by adding 10 ml of methanol containing 0.1 g. phenyl-beta-naphthylamine. The product is purified and isolated as described in Example 1. After vacuum drying 5 g. of a solid product which is amorphous under X-ray examination, looks like a non-vulcanized elastomer and is completely soluble in boiling n-heptane are obtained.

The infrared spectrographic examination shows the presence of unsaturations (zone between 6 and 6.5 microns). The ethylene/propylene molar ratio is about 1:1.

The product is vulcanized with the mix and under the conditions of Example I, to obtain a vulcanized lamina having the following characteristics:

Tensile strength, kg./cm.² _____ 35
Elongation at break, percent _____ 460
Modulus at 300%, kg./cm.² _____ 13

*Example 4*

200 cc. of anhydrous n-heptane and 5 cc. of 1,2-divinylcyclooctene-5 are introduced into the apparatus described in Example 1, kept at −10° C.

Through the gas inlet tube a gaseous ethylene butene-1 mixture in the molar ratio of 1:3 is introduced and circulated at the flow-rate of 200 N litres/hour.

In a 100 cc. flask kept under nitrogen the catalyst is preformed by reacting 2 millimols of vanadium tetrachloride and 10 millimols of aluminumethyl-sesquichloride in 30 cc. of anhydrous n-heptane at −10° C.

The ethylene butene-1 mixture is fed and discharged continuously at the flow rate of 200 N litres/hour.

After 15 minutes the reaction is stopped by adding 10 ml. of methanol containing 0.1 g. phenyl-beta-naphthylamine. The product is purified and isolated as described in Example 1.

After vacuum drying 5 g. of a solid product which is amorphous under X-ray examination, looks like a non-vulcanized elastomer and is completely soluble in boiling n-heptane are obtained.

The infrared spectrographic examination shows the presence of unsaturations (zone between 6 and 6.5 microns) and of mtehylenic sequences of various length (zone between 13 and 13.8 microns).

The terpolymer is vulcanized with the same mix and the same conditions used in Example 1. A vulcanized lamina having the following characteristics is obtained:

Tensile strength, kg./cm.² _____ 33
Elongation at break, percent _____ 460
Modulus at 300%, kg./cm.² _____ 13

As will be apparent, some modifications can be made in carrying out the invention without departing from the spirit thereof. It is intended, therefore, to include in the scope of the appended claims all modifications which will be apparent to those skilled in the art from the disclosures made, and the illustrative examples given, herein.

What we claim is:

1. Vulcanizable, high molecular weight, substantially linear amorphous copolymer of 1,2-divinylcyclooctene-5 with at least one monomer selected from the group consisting of ethylene and aliphatic alpha-olefins having the general formula R—CH=CH₂, in which R is an alkyl group containing from 1 to 6 carbon atoms, said copolymers consisting substantially of unsaturated macromolecules each of which contains units derived from each of the starting monomers.

2. Copolymers according to claim 1, further characterized in consisting substantially of macromolecules each of which contains units derived from at least one monomers selected from the group consisting of ethylene, propylene and butene-1, and units derived from 1,2-divinylcyclooctene-5.

3. Copolymers according to claim 1, further characterized in consisting substantially of macromolecules each of which contains units derived from ethylene, units derived from propylene, and units derived from 1,2-divinylcyclooctene-5.

4. The process for producing copolymers as defined in claim 1, characterized in that a mixture of the monomers is polymerized in the liquid phase in contact with a catalyst obtained by mixing
   (1) a vanadium compound selected from the group consisting of (a) vanadium halides and oxyhalides, (b) organic salts of vanadium, and (c) vanadium compounds in which at least one of the vanadium valencies is satisfied by a heteroatom selected from the group consisting of oxygen and nitrogen linked to an organic group with
   (2) a second catalyst-forming component selected from the group consisting of organometallic compounds of aluminum and beryllium,
at least one of the catalyst-forming components containing halogen.

5. The process according to claim 4, further characterized in that the vanadium compound used in preparing the catalyst is soluble in hydrocarbons.

6. The process according to claim 4, further characterized in that the vanadium compound used in preparing the catalyst is insoluble in hydrocarbons and selected from the group consisting of vanadium triacetate, vanadium tribenzoate, and vanadium tristearate.

7. The process according to claim 4, further characterized in that the copolymerization is carried out at temperatures between −80° C. and +125° C.

8. The process according to claim 4, further characterized in that the catalyst is prepared from a vanadium compound and an aluminum alkyl halide at a temperature between 0° and −80° C., and the copolymerization is also carried out at a temperature in said range.

9. The process according to claim 8, still further characterized in that the catalyst is prepared at a temperature between −10° C. and −50° C., and the copolymerization is carried out at a temperature in the same range.

10. The process according to claim 4, characterized in that the catalyst is prepared by mixing an aluminum trialkyl with a vanadium compound selected from the group consisting of vanadium halides and oxyhalides, the molar ratio of aluminum trialkyl to vanadium compound being between 1 and 5.

11. The process according to claim 4, characterized in that the catalyst is prepared by mixing aluminum diethylmonochloride with vanadium triacetylacetonate, the molar ratio of aluminum diethyl monochloride to vanadium triacetylacetonate being between 2 and 20.

12. The process according to claim 4, characterized in that the polymerization is carried out with monomers in the liquid state, in the absence of inert solvents.

13. The process according to claim 4, characterized in that the polymerization is carried out in the presence of an inert solvent.

14. The process according to claim 4, characterized in that the polymerization is carried out continuously by adding the catalyst components to the system continuously or periodically, and keeping constant the ratio between the concentrations of the monomers in the liquid phase.

15. The process according to claim 4, characterized in that the monomers copolymerized are propylene, ethylene, and the selected polyene, the ethylene to propylene molar ratio in the reacting liquid phase is lower than or at most equal to 1:4, and an amorphous copolymer is produced.

16. The process according to claim 4, characterized in that the monomers copolymerized are ethylene, butene-1, and the selected polyene, the ethylene to butene molar ratio in the reacting liquid phase is lower than or at least equal to 1:20, and an amorphous copolymer is produced.

17. The copolymers of claim 1, sulfur-cured to an elastomeric material.

References Cited by the Examiner

UNITED STATES PATENTS

| | | | |
|---|---|---|---|
| 2,809,372 | 10/1957 | Frederick et al. | 260—83.5 |
| 2,933,480 | 4/1960 | Gresham et al. | 260—80.5 |
| 3,058,963 | 10/1962 | Vandenberg | 260—88.2 |

JOSEPH L. SCHOFER, *Primary Examiner.*

W. HOOVER, *Assistant Examiner.*